Oct. 27, 1931.  L. T. PETERSEN  1,829,108
TWIN HOG TROUGH
Filed June 29, 1928
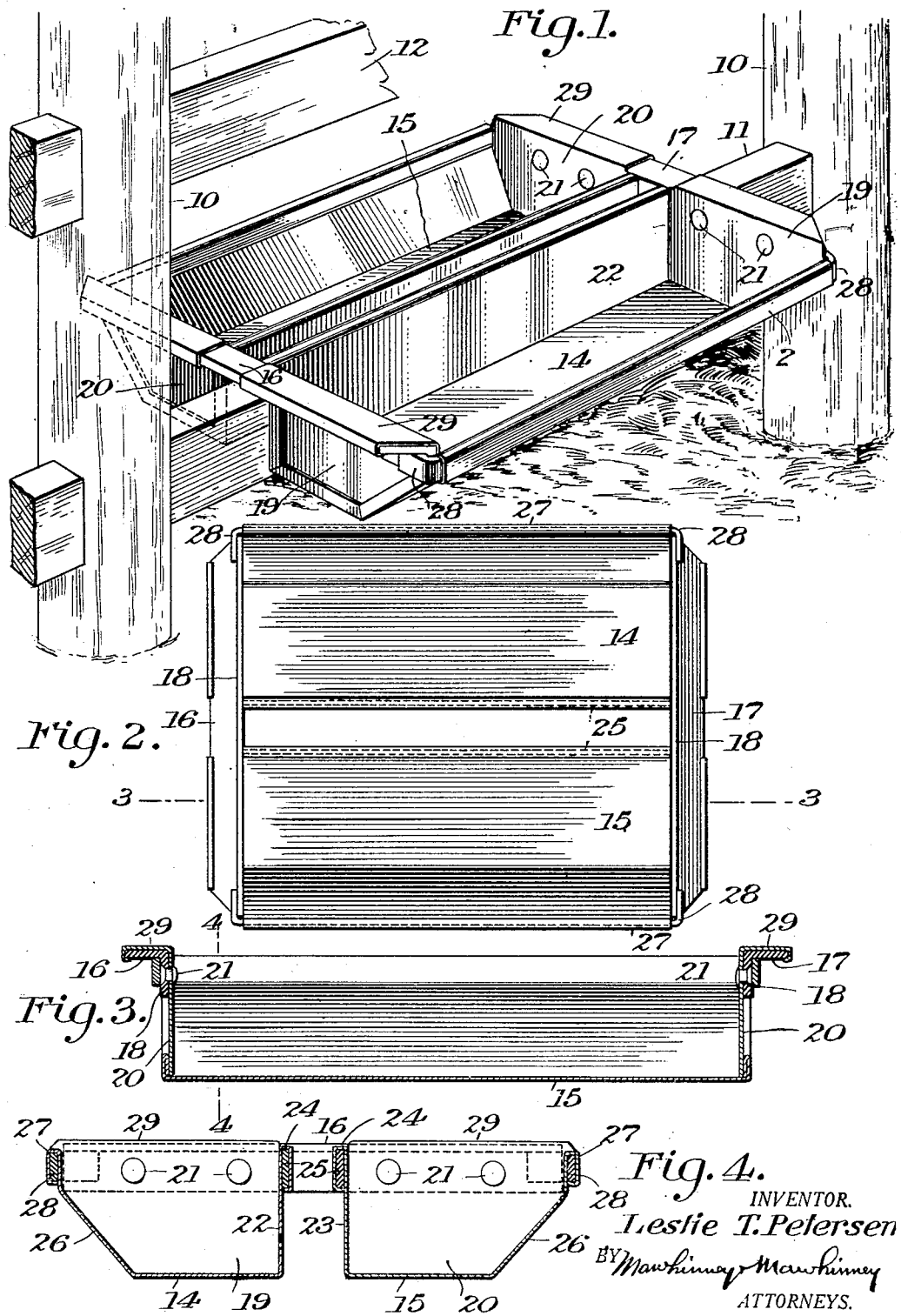
INVENTOR.
Leslie T. Petersen
BY Mawhinney & Mawhinney
ATTORNEYS.

Patented Oct. 27, 1931

1,829,108

UNITED STATES PATENT OFFICE

LESLIE T. PETERSEN, OF DENISON, IOWA

TWIN HOG TROUGH

Application filed June 29, 1928. Serial No. 289,165.

The present invention relates to feed troughs for animals and more particularly to a twin trough for feeding hogs and the like.

An object of the invention is to provide a feed trough comprising two feed holding compartments so built as to form a single unitary device.

A further object of the invention is to produce a feed trough which is adapted to fit between the lower rails of a fence and rest snugly upon the lowest rail so that the hogs cannot "root around the trough" and tip it over.

Another object is to provide a trough having two feeding compartments and adapted to be supported on the rail of a fence in such a manner that one compartment will be accessible to the animals on one side of the fence and the other compartment will be accessible to the animals on the opposite side of the fence.

A still further object of the invention is to provide a feed trough which can be quickly and easily slipped into position for use between the rails or boards of a fence or partition and securely held in place without the use of bolts, hooks or other means which are easily broken off.

The invention also aims to provide a feed trough which the farmer or any other person can very easily lift from the fence for cleaning or other purposes.

A further aim of the invention is to construct a feed trough to which the animals can have easy access.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a perspective view of a feed trough constructed according to the present invention, in position on a fence.

Figure 2 is a bottom plan view of the feed trough removed from the fence.

Figure 3 is a longitudinal section, enlarged, through one of the troughs on the line 3—3 of Figure 2, and Figure 4 is a transverse section through the twin trough taken on line 4—4 of Figure 3.

Referring to Figure 1 of the drawings, in which is illustrated a partition or fence having the posts 10, which support the boards or rails 11 and 12, the twin hog trough of this invention is shown in position for use on the fence. The hog trough consists of two feed holding compartments 14 and 15 which are securely held in closely spaced apart relation by angle irons 16 and 17. The inner faces of the vertical flanges 18 of the angle irons 16 and 17 lie against the outer faces of the end walls 19 and 20 of the respective compartments 14 and 15 and are fastened thereto by rivets 21.

The compartments 14 and 15 are closely spaced apart to provide a narrow channel between the inner walls 22 and 23 to allow the trough to be fitted somewhat snugly on the rail 11 with one compartment extending on each side of the partition. The inner walls 22 and 23 have their upper portions 24 rolled over and tightly gripping reinforcing strips 25, the ends of which abut against the inner faces of the vertical flanges of the angle irons 16 and 17 respectively.

The front walls 26 of the compartments 14 and 15 slope downwardly and inwardly so that a hog or other animal when feeding can approach very close to the trough.

The top portions 27 of the walls 26 are rolled over reinforcing strips 28 which are bent over at each end to engage the outer faces of the vertical flanges of the angle irons 16 and 17.

These reinforcing strips impart a rigidity and stability to the feed holding compartments. The upper portions 29 of the end walls 19 and 20 of the compartments 14 and 15 are bent outwardly at right angles to the planes of the end walls 19 and 20, extend over the upper faces of the horizontal flanges of the angle irons 16 and 17 and are bent downwardly about the outer edges of the angle irons.

In the structural embodiment disclosed in the drawing each compartment or trough section is made of sheet metal suitably bent and seamed to the desired shape and for holding liquid as well as solid feed. The metal selected is of sufficient gauge to give the necessary stability to the structure and to combine with the angle irons 16 and 17 to form a unitary device which is strong and durable and capable of withstanding rough usage.

The relatively narrow channel or socket formed between the trough sections or compartments 14 and 15 maintains the device from rocking to any appreciable extent upon the supporting rail 11 and also insures the binding of the inner walls 22 and 23 against one or the other of the sides of the rail 11 when the device is tilted or canted by the nosing of the hogs beneath the front walls 26, the binding of the inner walls 22 and 23 serving to prevent the accidental lifting and displacement of the device.

The angle irons 16 and 17 are preferably relatively heavy and strong to support the entire device at their lower edges across the rail 11 and to also hold the trough sections in connected relation.

The use of the device is apparent, for to place it, it is merely necessary to insert the device half way between the rails 11 and 12 until the channel registers with the lower rail 11. The device is now lowered into position with the intermediate portions of the angle irons 16 and 17 lying across the upper edge of the rail 11. The device is capable of application to fences, walls or any other structures wherein is provided a slot or opening of sufficient size for the introduction of the device therethrough and which has a suitable supporting portion to engage in the channel between the troughs. The device may be quickly and easily lifted from place and cleansed and refilled, and replaced with but few operations and practically no skill in its handling.

It is obvious that various changes and modifications may be made in the details of construction and design of the above specifically described embodiment of this invention without departing from the spirit thereof, such changes and modifications being restricted only by the scope of the following claim:—

What is claimed is:—

A twin hog trough for suspension over a fence rail or the like, comprising a pair of independent troughs, each trough having a straight rear wall and a downwardly and inwardly sloping front wall and opposite end walls connecting said rear and front walls together, the upper portion of the front and rear walls of each trough being rolled over, reinforcing strips gripped by the rolled over portions of the front and rear walls, the upper portions of the end walls being bent at right angles to the planes of the end walls, and angle irons engaged by the bent portions of the end walls and secured to the upper portions of the end walls at each end of the troughs to hold the troughs together in spaced apart relation with the straight rear walls of the troughs facing one another, defining a socket to receive therein a fence rail or the like, bounded by the straight rear walls and the angle irons, said straight rear walls providing relatively large flat surfaces adapted to snugly engage the fence rail.

In testimony whereof I affix my signature.

LESLIE T. PETERSEN.